United States Patent
Chen et al.

(10) Patent No.: US 10,671,824 B2
(45) Date of Patent: Jun. 2, 2020

(54) DECODING DESIGNATED BARCODE IN FIELD OF VIEW OF BARCODE READER

(71) Applicant: Zebra Technologies Corporation, Lincolnshire, IL (US)

(72) Inventors: Chunhua Chen, East Setauket, NY (US); Harry E. Kuchenbrod, Kings Park, NY (US); Carl D. Wittenberg, Water Mill, NY (US); Chinh Tan, East Setauket, NY (US); Daniel F. Brown, Northport, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/955,612

(22) Filed: Apr. 17, 2018

(65) Prior Publication Data

US 2019/0318141 A1 Oct. 17, 2019

(51) Int. Cl.
*G06K 7/10* (2006.01)

(52) U.S. Cl.
CPC ..... *G06K 7/10732* (2013.01); *G06K 7/10861* (2013.01); *G06K 7/10881* (2013.01); *G06K 2007/10524* (2013.01)

(58) Field of Classification Search
CPC .................................................. G06K 7/10732
USPC .................................................. 235/462.42
See application file for complete search history.

(56) References Cited

U.S. PATENT DOCUMENTS

| | | | |
|---|---|---|---|
| 8,469,275 B2 | 6/2013 | Dahari | |
| 2006/0081712 A1* | 4/2006 | Rudeen | G06K 7/10722 235/462.08 |
| 2006/0118635 A1* | 6/2006 | Joseph | G02B 7/08 235/462.24 |
| 2015/0034724 A1* | 2/2015 | He | G06K 7/1443 235/462.08 |
| 2015/0310246 A1 | 10/2015 | Wang et al. | |
| 2018/0352060 A1* | 12/2018 | Gifford | H04M 1/0264 |

OTHER PUBLICATIONS

International Search Report and Written Opinion for International Application No. PCT/US2019/027691 dated Jul. 2, 2019.

* cited by examiner

*Primary Examiner* — Allyson N Trail
(74) *Attorney, Agent, or Firm* — Yuri Astvatsaturov

(57) ABSTRACT

Embodiments of the present invention generally relate to the field of barcode readers, and more particularly, to barcode readers designed to operate in an environment with densely packed barcodes. In an embodiment, the present invention is a barcode reader that includes an imaging assembly operable to capture image frames; an aiming light assembly operable to emit an aiming light; and a controller configured to: decode a barcode within a decode frame image captured by the imaging assembly; upon decoding the barcode within the decode frame image, cause a capture of a picklist frame image; and report the barcode to an external host upon at least some overlap between a location of the barcode within the decode frame image and the location of the at least a portion of the aiming light pattern in the picklist frame image.

12 Claims, 4 Drawing Sheets

DECODING DESIGNATED BARCODE IN FIELD OF VIEW OF BARCODE READER

BACKGROUND

Barcode readers are commonplace today, and are used in a variety of environments to reader barcodes often attached to various items. In some cases, like barcode lists, barcodes are provided in a densely packed composition where a plurality of barcodes are separated from each other by mere inches. This can be problematic for many barcode readers as their field of view (FOV) can be wide enough to encompass multiple barcodes when the barcode reader is held a convenient distance away from the barcode list. In some cases, the readers may report a decoded barcode that, while being decodable, is positioned at an extreme periphery of the FOV. In other instances, the reader may simply output a decode error and/or not output a successful decode at all. As such, there is a need for devices, systems, and methods directed towards decoding a desired barcode in a working environment where barcodes are packed densely together.

SUMMARY

Accordingly, at least some embodiments of the present invention are directed towards decoding a desired barcode in a working environment where barcodes are packed densely together.

In an embodiment, the present invention is a method of conducting a barcode-read operation by a barcode reader having a controller, an imaging assembly operable to capture image frames, and an aiming light assembly operable to emit an aiming light having an aiming light pattern, the method comprising: capturing, via the imaging assembly, a decode frame image; decoding, via the controller, a barcode within the decode frame image; upon decoding the barcode within the decode frame image, capturing, via the imaging assembly, a picklist frame image; detecting, within the picklist frame image, a portion of the picklist frame image illuminated by at least a part of the aiming light; and reporting, to a host, the decoding of the barcode when the portion of the picklist frame image at least partially overlaps with the barcode.

In another embodiment, the present invention is a barcode reader, comprising: a housing; an imaging assembly positioned within the housing and operable to capture image frames; an aiming light assembly positioned within the housing and operable to emit an aiming light having an aiming light pattern; and a controller positioned with the housing and communicatively coupled to the imaging assembly and the aiming light assembly, where the controller is configured to: decode a barcode within a decode frame image captured by the imaging assembly; upon decoding the barcode within the decode frame image, cause the imaging assembly to capture a picklist frame image; determine, within the picklist frame image, a location of at least a portion of the aiming light pattern; and report the barcode to an external host upon at least some overlap between a location of the barcode within the decode frame image and the location of the at least a portion of the aiming light pattern in the picklist frame image.

In still another embodiment, the present invention is an imaging engine for use in a barcode reader, comprising: an imaging assembly operable to capture image frames; an aiming light assembly positioned relative to the imaging assembly and operable to emit an aiming light having an aiming light pattern; and a controller communicatively coupled to the imaging assembly and the aiming light assembly, where the controller is configured to: decode a barcode within a decode frame image captured by the imaging assembly; upon decoding the barcode within the decode frame image, cause the imaging assembly to capture a picklist frame image; determine, within the picklist frame image, a location of at least a portion of the aiming light pattern; and report the barcode to an external host upon at least some overlap between a location of the barcode within the decode frame image and the location of the at least a portion of the aiming light pattern in the picklist frame image.

These and other features, aspects, and advantages of the present disclosure will become better-understood with reference to the following drawings, description, and any claims that may follow.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
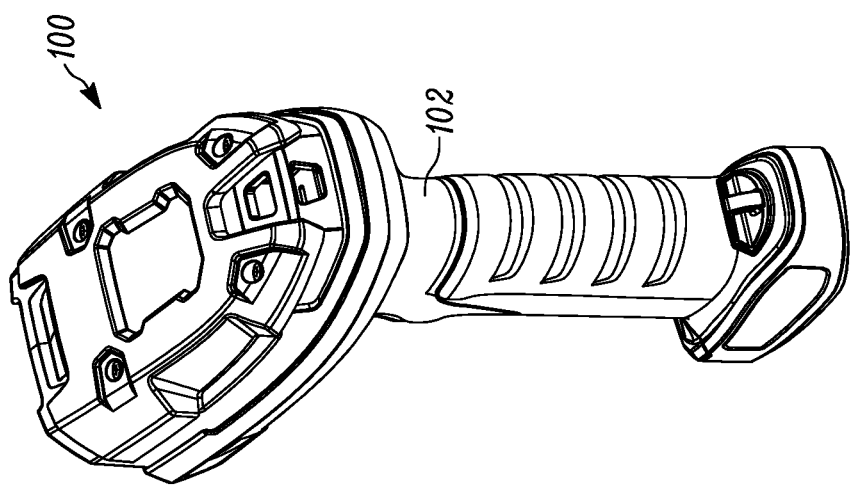
FIG. 1 illustrates front and rear perspective views of a barcode reader, in accordance with an embodiment of the present invention.
Figure 1:
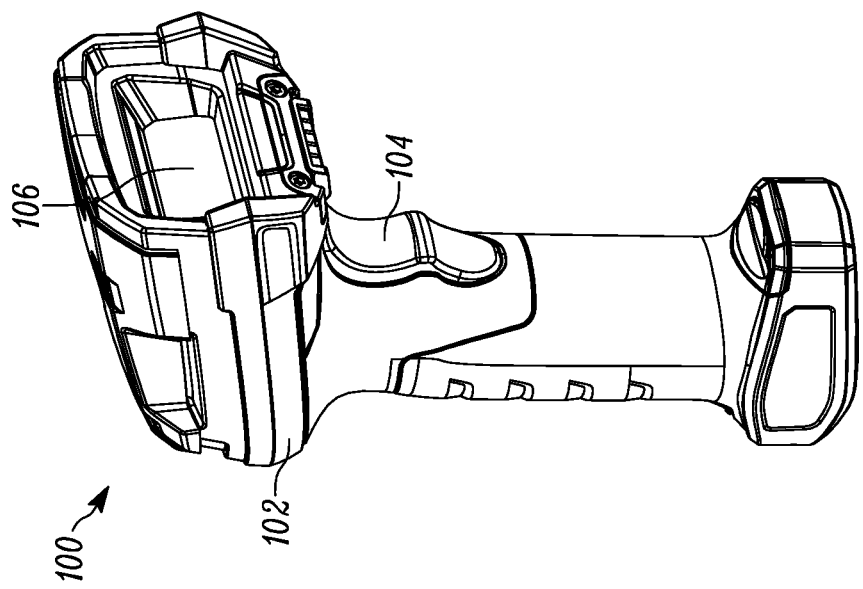

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Referring to FIG. 1, shown therein is an exemplary barcode reader 100 having a housing 102 with a cavity for housing internal components, a trigger 104, and a window 106. The barcode reader 100 can be used in a hands-free mode as a stationary workstation when it is placed on the countertop in a supporting cradle (not shown). The barcode reader 100 can also be used in a handheld mode when it is picked up off the countertop (or any other surface) and held in an operator's hand. In the hands-free mode, products can be slid, swiped past, or presented to the window 106. In the handheld mode, the barcode reader 100 can be aimed at a barcode on a product, and the trigger 104 can be manually depressed to initiate imaging of the barcode. In some implementations, the supporting cradle can be omitted, and the housing 102 can also be in other handheld or non-handheld shapes.

Figure 2:
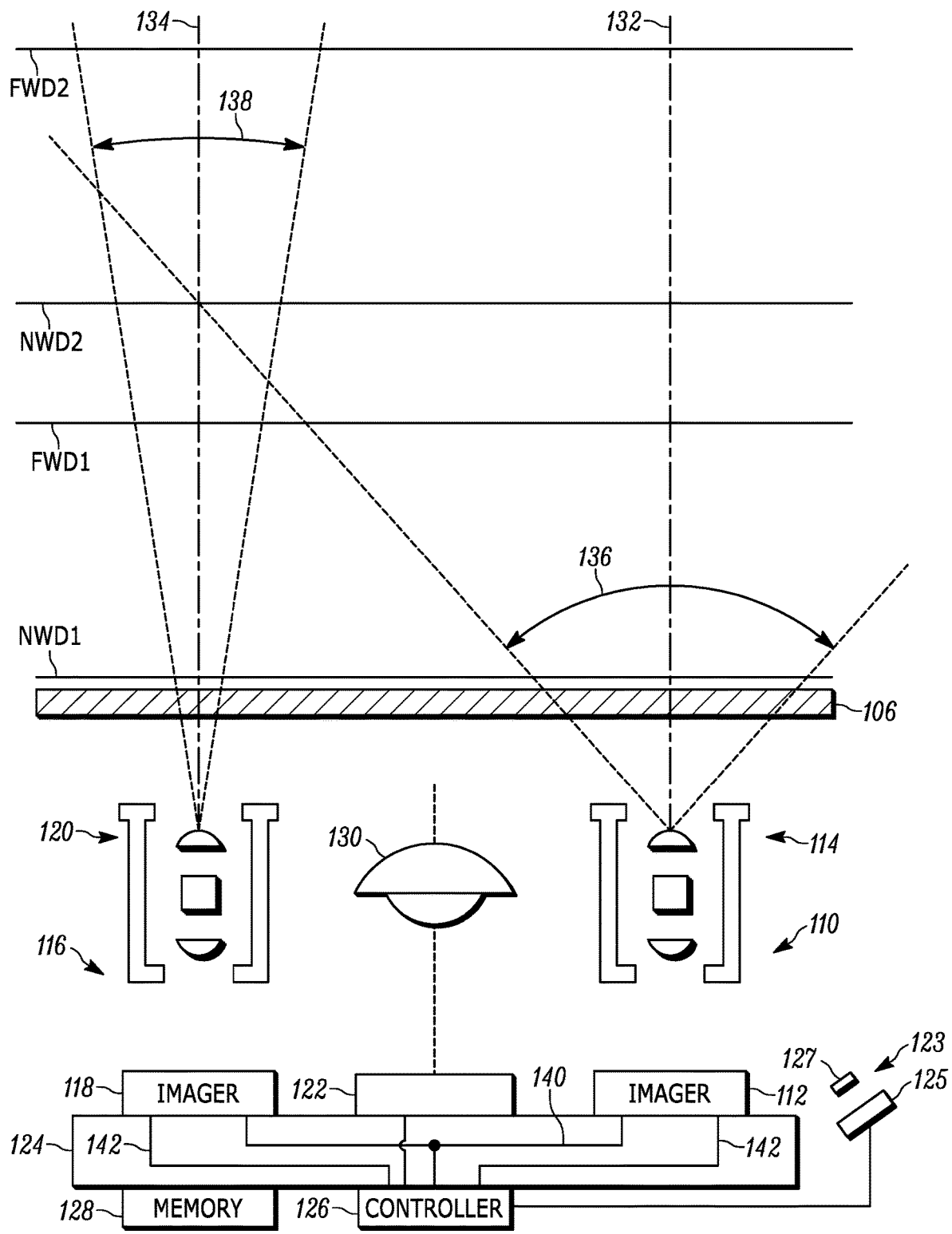
FIG. 2 illustrates a block schematic diagram some of the components of the barcode reader of FIG. 1.

FIG. 2 illustrates a block schematic diagrams of a portion of a barcode reader 100 in accordance with some embodiments. It should be understood that FIG. 2 is not drawn to scale. The barcode reader 100 in FIG. 2 includes the following components: (1) a first optical assembly 110 that includes a first imaging sensor 112 and a first imaging lens assembly 114; (2) a second optical assembly 116 that includes a second linear imaging sensor 118 and a second imaging lens assembly 120; (3) an illumination source 122; (4) a printed circuit board (PCB) 124 supporting the first and second linear imaging sensors 112, 118, and the illumination source 122; (5) a controller 126 positioned on the PCB 124 and communicatively coupled to the first and second linear imaging sensors 112, 118, and the illumination source 124; (6) a memory 128 connected to the controller 126; (7) an illumination lens assembly 130 positioned in front of the illumination source 122; and (8) an aiming light assembly 123 having an aiming light source 125 and an aiming lens assembly 127. In referring to portions of the barcode reader, certain components may be grouped and referred to as an "imaging engine." In some instances, the imaging engine can be said to include image capture components like the image sensor(s). In other instances, the imaging engine can be said to include additional elements such as, for example, an aiming light assembly and/or the illumination assembly.

The first and second imagers 112, 118 can be either CCD or CMOS imaging sensors and may either be linear or two-dimensional sensors. Linear image sensors generally include multiple photosensitive pixel elements aligned in one-dimensional array. Two-dimensional sensors generally include mutually orthogonal rows and columns of photosensitive pixel elements arranged to form a substantially flat surface. The first and second imagers 112, 118 are operative to detect light captured, respectively, by the first and second imaging lens assemblies 114, 120 along a respective optical path or axis 132, 134 through the window 106. Generally, each respective imager and imaging lens assembly pair is designed to operate together for capturing light scattered, reflected, or emitted from a barcode as pixel data over a respective field of view (FOV). However, each lens/imager pair (also referred to as an optical assembly) is configured with different parameters.

In the currently described embodiment, the first optical assembly 110 is designed to read barcodes over a relatively near working distance that extends between NWD1 and NWD2. In some embodiments, NDW1 is approximately 0 inches from the window 106 and NWD2 is approximately 28 to 32 inches from the window 106. Additionally, optical assembly 110 captures light from a relatively wider FOV 136. On the other hand, the second optical assembly 116 is designed to read barcodes over a relatively far working distance that extends between FWD1 and FWD2. In some embodiments, FDW1 is approximately 24 inches from the window 106 and FWD2 is approximately 600 to 680 inches from the window 106. Additionally, optical assembly 116 captures light from a relatively narrower FOV 138.

In some instances of use, barcode operators may find themselves pointing the barcode reader such that multiple barcodes are within the reader's FOV. Additionally, in some working environments, a plurality of barcodes may be positioned tightly in a space, causing the operator to unintentionally position the reader's FOV over a barcode that is not meant to be read. Thus, to allow acquisition and/or selection of the appropriate barcode, the aforementioned components may be configured as further described herein.

Figure 3:
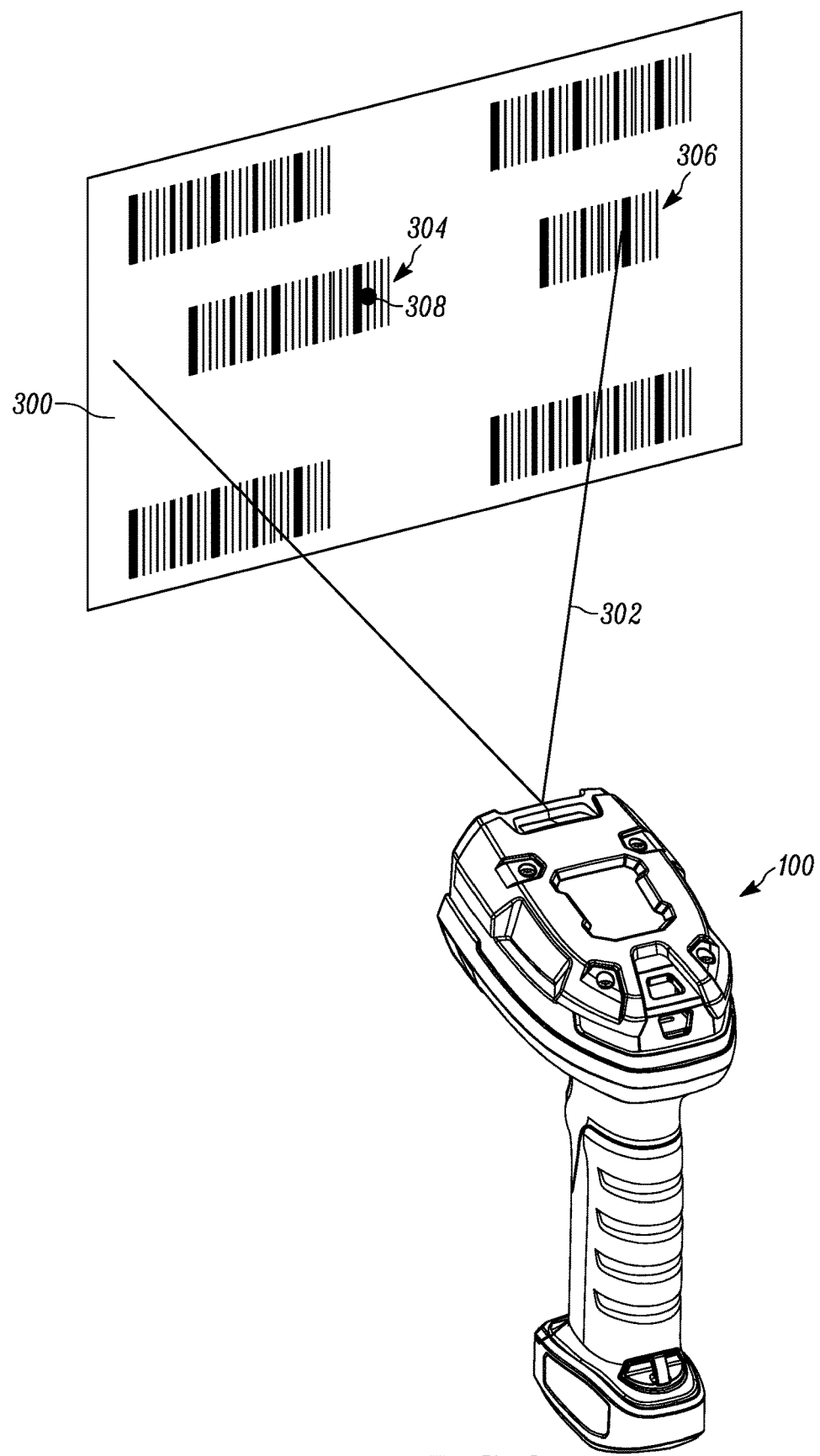
FIG. 3 illustrates a barcode reader being used in an environment, in accordance with an embodiment of the present invention.
Figure 4:
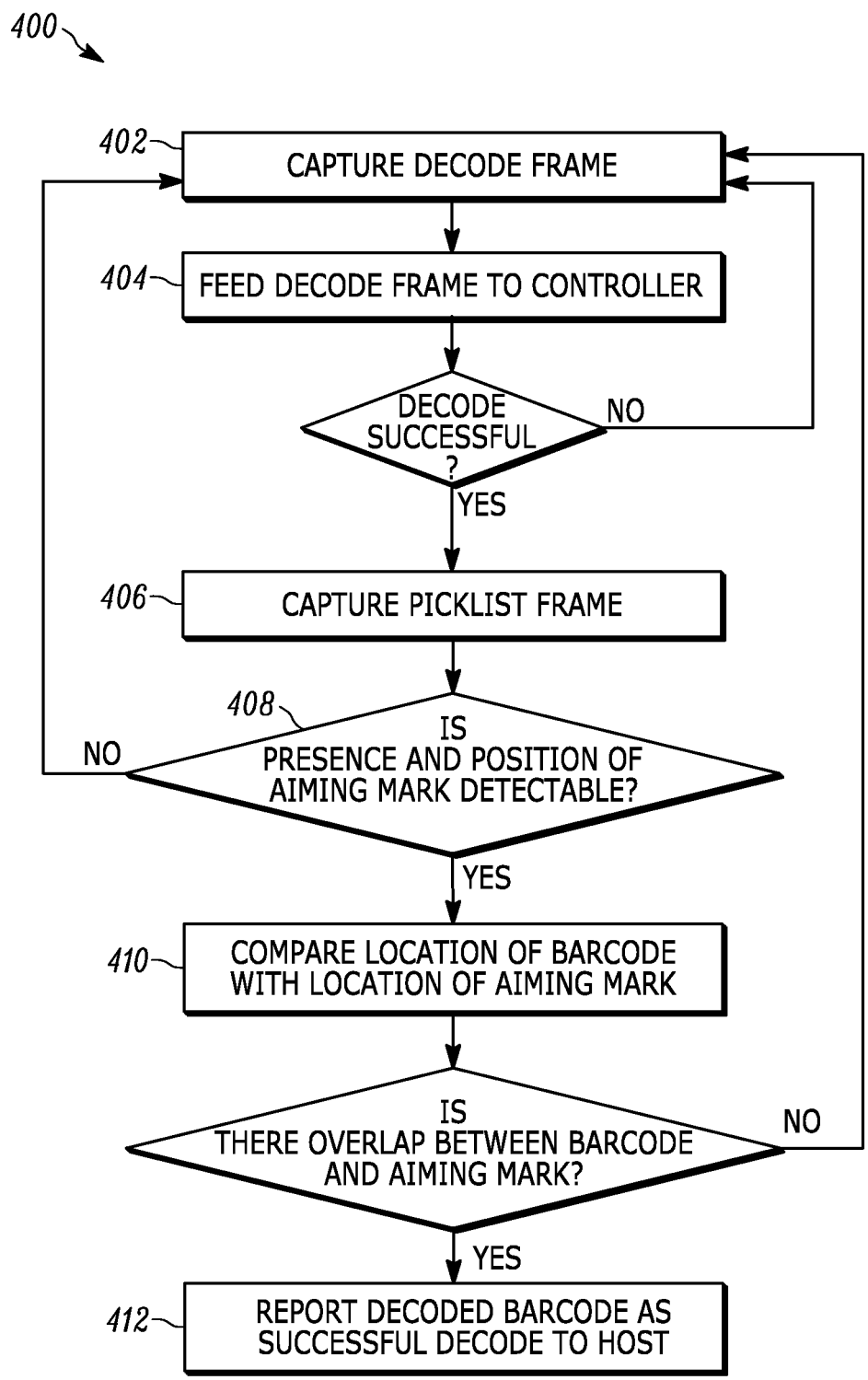
FIG. 4 illustrates a flowchart representative of a method used to read barcodes, in accordance with an embodiment of the present invention.

Referring to FIG. 3, shown therein is an example of a barcode reader 100 pointing at a working surface 300 such that its FOV 302 overlaps a plurality of barcodes 304, 306. In such a scenario, the barcode reader 100 can be configured, by way of its controller, to report the decoding of only one of the barcodes that falls within certain criteria. FIG. 4 illustrates a flowchart representative of a method 400 used to decode and report the one of the barcodes. The method begins with capturing a decode frame in step 402 and feeding that frame into a decoder (which may be considered to be a part of the overall controller) in step 404. A decode frame may be considered to be an image frame that has the aiming light source turned off or dimmed, and the imager parameters (e.g., gain, exposure time, etc.) and the illumination assembly parameters (e.g., duration of illumination pulse, intensity of illumination, etc.) set in a manner that is conducive to capturing a focused and/or properly contrasted (i.e., not oversaturated or undersaturated) image of the environment. Preferably, the parameters are set such that if the image includes a barcode, that barcode would be decodable by a controller employing decoding techniques common within the art. If the decode frame has no decodable barcodes, the process returns to step 402 to continue capturing decode frames. On the other hand, if the controller is able to decode a barcode within the decode frame, the method proceeds to step 406 where the reader captures a picklist frame. A picklist frame may be considered to be an image frame that has the aiming light source turned on or turned up (relative to the dimmed levels that the aiming light source is operated at during the capture of a decode frame), and the imager parameters (e.g., gain, exposure time, etc.) and the illumination assembly parameters (e.g., duration of illumination pulse, intensity of illumination pulse, etc.) set in a manner that is conducive to capturing a focused and/or properly contrasted (i.e., not oversaturated or undersaturated) image of the environment. In a preferred embodiment, for capturing the picklist frame, the imager parameters and the illumination assembly parameters are set to the same settings as they were set during the capture of the last decode frame that included the decodable barcode.

It will be appreciated that an aiming light assembly generally serves the purpose of providing an aiming light pattern designed to give the operator a visual indication of the FOV's center, FOV's central region, or other reference point that can assist the operator in orienting the reader. As such, it is commonly provided by way of a discernable (e.g., bright) visual indicator (e.g., a dot aimed at the approximate center of the FOV) that is typically bright enough for the operator to see in the normal course of use. An example of an aiming mark is illustrated in FIG. 3 as a round dot 308 that overlaps with the barcode 304. In some embodiments, this light pattern can be achieved via a laser light source and appropriate optics that direct the beam of light in the desired direction. In some embodiments, the laser light source can be replaced with a light emitting diode (LED). Since the aiming light pattern is normally intended to be visible by the operator, it is typically brighter than the environment that it is being projected on. Consequently, during the capture of the picklist frame where the aiming light source is turned on or turned up, the resulting frame includes a portion of an image that represents the aiming light pattern (also referred to as an 'aiming mark') and that is distinctly brighter (e.g., oversaturated, above a predetermined brightness intensity threshold, etc.) relative to the remaining portions of the image. While in most cases, the presence of the aiming mark will be readily discernable via image analysis, that may not occur under some lighting conditions. Thus, in step 408, the method attempts to detect the presence of the aiming mark along with its position within the image. If the aiming mark cannot be detected, the method can return to step 402 to restart the reading process. Otherwise, the method proceeds to step 410 where the controller compares the location of the barcode previously decoded from the decode frame and the location of the aiming mark as it is obtained from the picklist frame. In this case, references to the feature locations can be understood to mean their location within the image itself. This may be evaluated on, for example, a pixel level, an image section (e.g., quadrant) level, or any other suitable approach where the relative position of the barcode within the captured decode frame image is compared to the relative position of the aiming mark within the picklist frame image. If it is determined that there is no overlap or an insufficient amount of overlap between the position of the decoded barcode and the aiming mark, the controller can return to step 402 to begin the read process over again. Otherwise, if it is determined that there is some minimum amount of overlap between the position of the decoded barcode and the aiming mark, the controller reports a successful decode to an external host such as, for example, a point of sale (POS) system, a computer, etc.

In some embodiments, if the process returns to step 402 upon determining that there is no overlap or an insufficient amount of overlap between the position of the decoded barcode and the aiming mark, the process can be configured to skip steps 406 and 408, proceeding directly to step 410 upon a successful decode of a barcode in a decode frame. This can be the case because a picklist frame will have already been captured and the position of the aiming mark will have already been determined. Thus, there may not be a need to recapture another picklist frame and to redetect the presence and the position of the aiming mark.

It should be apparent that in some cases, more than one barcode will be within the FOV of the reader when the decode frame is captured, as may be the case in FIG. 3 where barcodes 304, 306 are positioned within the FOV 302. In this case, the controller may be configured to (i) select one of the barcodes for the comparison step 410, or (ii) compare the locations of both barcodes to the location of the aiming mark.

In some embodiments, the minimum amount of overlap may be determined by the number of pixels that are determined to overlap between the barcode and the aiming mark. If that number of pixels exceeds a predetermined threshold, an overlap between the barcode and the aiming mark can be said to exist. In some embodiments, the number of pixels may be dependent on some underlying factors such as, for example, the number of pixels occupied by the aiming mark and/or the number of pixels occupied by the decoded barcode. For example, the minimum overlap threshold can be set to 20% of the total number of pixels occupied by the aiming mark. In that case, if it is determined that the aiming mark occupies 200 pixels within the picklist frame, for an overlap between the decoded barcode and the aiming mark to exist, at least 40 of the 200 pixels of the aiming mark must overlap with the barcode. It should be understood that while the barcode appears in one image and the aiming mark appears in the other image, an overlap between those elements may be viewed as, for example, an overlap when the images are superimposed on each other. Another way to consider an overlap is by the x:y locations of pixels occupied by the respective elements. In other words, if the barcode in the decode frame image appears over pixel 1340:1 and the aiming mark in the picklist frame image appears over pixel 1340:1, then the barcode and the aiming mark can be said to overlap as they are positioned at the same pixel in their respective images.

It should be appreciated that while the above examples have been described with reference to a barcode reader 100 which includes multiple imaging sensors, and thus multiple imaging assemblies, concepts described herein are equally applicable to barcode readers having only one image sensor. Likewise, these concepts are also applicable to barcode readers having more than two image sensors. Finally, the methods described herein may be implemented in barcode readers via a setting that is manually enabled by the operator where the operator is aware that he or she will be scanning barcodes in an environment where a plurality of barcodes are densely populated. In some embodiments, this setting may be activated automatically upon the detection of multiple barcodes within the FOV.

Implementing the aforementioned configurations in a barcode reader can be particularly advantageous as it could allow one to more-accurately read barcodes in an environment where multiple barcodes are positioned densely together. Additionally, since the reader can bypass reporting a successful decode to an external host in the event that the barcode is outside the designated aiming mark, these configurations can help the operator avoid unintentionally reading barcodes that happened to be closer to the boundaries of the reader's FOV. Additionally, these configurations can be particularly useful in implementations employing linear imagers where accurate detection of an aiming mark can be more challenging than in implementations employing 2D imagers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method of conducting a barcode-read operation by a barcode reader having a controller, an imaging assembly operable to capture image frames, and an aiming light assembly operable to emit an aiming light having an aiming light pattern, the method comprising:
   capturing, via the imaging assembly, a decode frame image;
   decoding, via the controller, a-two or more barcodes within the decode frame image;
   upon decoding the two or more barcodes within the decode frame image, capturing, via the imaging assembly, a picklist frame image;
   detecting, within the picklist frame image, a portion of the picklist frame image illuminated by at least a part of the aiming light to define a location of the aiming light pattern;
   comparing the location of the aiming light pattern within the picklist frame image to respective locations of each of the two or more barcodes within the decode frame image;
   selecting one of the barcodes when the location of the aiming light pattern within the picklist frame image at least partially overlaps with the location of the one of the barcodes within the decode frame image; and
   reporting, to a host, the decoding of the selected barcode.

2. The method of claim 1, wherein the imaging assembly includes a linear imager.

3. The method of claim 1,
   wherein the operation of capturing the decode frame image includes operating the aiming light assembly at a first level of intensity,
   wherein the operation of capturing the picklist frame image includes operating the aiming light assembly at a second level of intensity, and
   wherein the second level of intensity is greater than the first level of intensity.

4. The method of claim 1,
   wherein the aiming light assembly does not emit the aiming light during at least a portion of the operation of capturing the decode frame image; and
   wherein the aiming light assembly emits the aiming light during at least a portion of the operation of capturing the picklist frame image.

5. A barcode reader, comprising:
   a housing;
   an imaging assembly positioned within the housing and operable to capture image frames;
   an aiming light assembly positioned within the housing and operable to emit an aiming light having an aiming light pattern; and
   a controller positioned with the housing and communicatively coupled to the imaging assembly and the aiming light assembly, the controller being configured to:
      decode two or more barcodes within a decode frame image captured by the imaging assembly;
      upon decoding the two or more barcodes within the decode frame image, cause the imaging assembly to capture a picklist frame image;

determine, within the picklist frame image, a location of at least a portion of the aiming light pattern;

compare the location of the at least a portion of the aiming light pattern within the picklist frame image to respective locations of each of the two or more barcodes within the decode frame image;

select one of the barcodes when the location of the at least a portion of the aiming light pattern within the picklist frame image at least partially overlaps with the location of the one of the barcodes within the decode frame image; and report the selected barcode to an external host.

6. The barcode reader of claim 5, wherein the imaging assembly includes a linear imager.

7. The barcode reader of claim 5, wherein the controller is configured to operate the aiming light assembly at a first level of intensity during a capture of the decode frame image, wherein the controller is configured to operate the aiming light assembly at a second level of intensity during a capture of the picklist frame image, and wherein the second level of intensity is greater than the first level of intensity.

8. The barcode reader of claim 5, wherein the controller is configured to cause the aiming light assembly to not emit the aiming light during at least a portion of a capture of the decode frame image, and wherein the controller is further configured to cause the aiming light assembly to emit the aiming light during at least a portion of a capture of the picklist frame image.

9. An imaging engine for use in a barcode reader, comprising:

an imaging assembly operable to capture image frames;

an aiming light assembly positioned relative to the imaging assembly and operable to emit an aiming light having an aiming light pattern; and a controller communicatively coupled to the imaging assembly and the aiming light assembly, the controller being configured to:

decode two or more barcodes within a decode frame image captured by the imaging assembly;

upon decoding the two or more barcodes within the decode frame image, cause the imaging assembly to capture a picklist frame image;

determine, within the picklist frame image, a location of at least a portion of the aiming light pattern;

compare the location of the at least a portion of the aiming light pattern within the picklist frame image to respective locations of each of the two or more barcodes within the decode frame image;

select one of the barcodes when the location of the at least a portion of the aiming light pattern within the picklist frame image at least partially overlaps with the location of the one of the barcodes within the decode image frame; and report the selected barcode to an external host.

10. The imaging engine of claim 9, wherein the imaging assembly includes a linear imager.

11. The imaging engine of claim 9, wherein the controller is configured to operate the aiming light assembly at a first level of intensity during a capture of the decode frame image, wherein the controller is configured to operate the aiming light assembly at a second level of intensity during a capture of the picklist frame image, and wherein the second level of intensity is greater than the first level of intensity.

12. The imaging engine of claim 9, wherein the controller is configured to cause the aiming light assembly to not emit the aiming light during at least a portion of a capture of the decode frame image, and wherein the controller is further configured to cause the aiming light assembly to emit the aiming light during at least a portion of a capture of the picklist frame image.

\* \* \* \* \*